(12) United States Patent
Saitho et al.

(10) Patent No.: US 9,871,272 B2
(45) Date of Patent: Jan. 16, 2018

(54) SECONDARY BATTERY

(71) Applicant: NEC Corporation, Tokyo (JP)

(72) Inventors: Shinsaku Saitho, Tokyo (JP); Hitoshi Ishikawa, Tokyo (JP); Kazuhiko Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/649,026

(22) PCT Filed: Nov. 28, 2013

(86) PCT No.: PCT/JP2013/082085
§ 371 (c)(1),
(2) Date: Jun. 2, 2015

(87) PCT Pub. No.: WO2014/087922
PCT Pub. Date: Jun. 12, 2014

(65) Prior Publication Data
US 2015/0318577 A1    Nov. 5, 2015

(30) Foreign Application Priority Data

Dec. 3, 2012  (JP) ................................ 2012-264632

(51) Int. Cl.
*H01M 10/0569* (2010.01)
*H01M 10/0525* (2010.01)
*H01M 10/04* (2006.01)
*H01M 10/052* (2010.01)
*H01M 10/0567* (2010.01)

(52) U.S. Cl.
CPC ..... *H01M 10/0569* (2013.01); *H01M 10/049* (2013.01); *H01M 10/052* (2013.01); *H01M 10/0525* (2013.01); *H01M 10/0567* (2013.01); *H01M 2300/0034* (2013.01); *H01M 2300/0037* (2013.01); *Y02T 10/7011* (2013.01); *Y10T 29/49112* (2015.01)

(58) Field of Classification Search
None
See application file for complete search history.

(56) References Cited

U.S. PATENT DOCUMENTS

2004/0043300 A1*  3/2004  Utsugi ............. H01M 10/0567
                                                           429/329

FOREIGN PATENT DOCUMENTS

| JP | 2000-133304 |   | 5/2000 |
|----|-------------|---|--------|
| JP | 2001-57236  |   | 2/2001 |
| JP | 2001057236 A| * | 2/2001 |
| JP | 2001-297793 |   | 10/2001|

(Continued)

OTHER PUBLICATIONS

JP 2001-057236 (Hibara)—Non-aqueous electrolyte & secondary battery using same (Espacenet and AIPN translation).*

(Continued)

*Primary Examiner* — Sarah A Slifka
*Assistant Examiner* — Haroon S Sheikh
(74) *Attorney, Agent, or Firm* — Finnegan, Henderson, Farabow, Garrett & Dunner, L.L.P.

(57) ABSTRACT

The present invention relates to an electrolyte solution for a lithium secondary battery, which contains a sulfonate compound represented by a specific formula and carboxylic anhydride having one or more C=C double bonds, and a lithium secondary battery using the same.

6 Claims, 1 Drawing Sheet

(56) References Cited

FOREIGN PATENT DOCUMENTS

| | | |
|---|---|---|
| JP | 2001-313071 | 11/2001 |
| JP | 2002-158035 | 5/2002 |
| JP | 2004-281368 | 10/2004 |
| JP | 2007-53083 | 3/2007 |
| JP | 2011-187235 | 9/2011 |

OTHER PUBLICATIONS

International Search Report dated Jan. 14, 2014 in corresponding PCT International application.

* cited by examiner

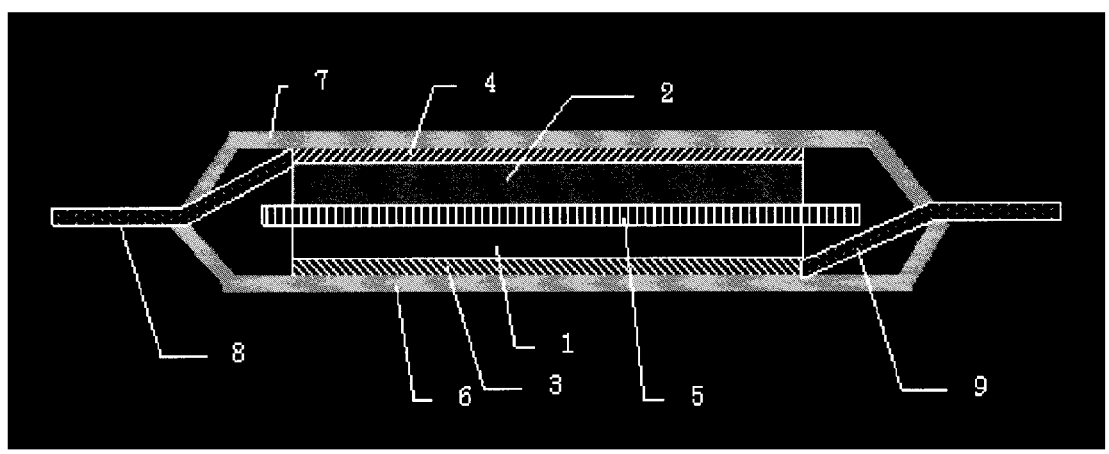

SECONDARY BATTERY

CROSS-REFERENCE TO RELATED PATENT APPLICATIONS

This application is a National Stage Entry of International Application No. PCT/JP2013/082085, filed Nov. 28, 2013, which claims priority from Japanese Patent Application No. 2012-264632, filed Dec. 3, 2012. The entire contents of the above-referenced applications are expressly incorporated herein by reference.

TECHNICAL FIELD

The present invention relates to an electrolyte solution for a secondary battery and a secondary battery using the same.

BACKGROUND ART

With the rapid extension of the markets including notebook-type personal computers, portable telephones and electric vehicles, secondary batteries having high energy density are required. Means for obtaining secondary batteries having high energy density include a method of using materials of a negative electrode having a high capacity, and a method of using a non-aqueous electrolyte solution excellent in stability.

In a lithium secondary battery, carbonate solvents, e.g., ethylene carbonate (EC) are preferably used. However, when a carbon material, e.g., graphite is used in a negative electrode, there is a problem that the electrolyte solution decomposes at the negative electrode and the characteristics of the battery deteriorate.

In Patent Literatures 1 and 2, for improving battery characteristics, a non-aqueous electrolyte solution containing a chain disulfonate derivative represented by a specific formula is described. In Patent Literatures 3, 4 and 5, cyclic monosulfonates such as propane sultone, and maleic anhydride are described as the compounds to be contained in a non-aqueous electrolyte solution. In Patent Literature 6, it is described that a non-aqueous electrolyte solution containing a cyclic sulfonate compound can also include carboxylic anhydride as the auxiliary.

CITATION LIST

Patent Literature

Patent Literature 1: Japanese Patent Laid-Open No. 2000-133304
Patent Literature 2: Japanese Patent Laid-Open No. 2001-313071
Patent Literature 3: Japanese Patent Laid-Open No. 2002-158035
Patent Literature 4: Japanese Patent Laid-Open No. 2001-297793
Patent Literature 5: Japanese Patent Laid-Open No. 2007-053083
Patent Literature 6: Japanese Patent Laid-Open No. 2011-187235

SUMMARY OF INVENTION

Technical Problem

However, the secondary batteries using the electrolyte solutions as described in the above documents are insufficient both in a capacity maintaining rate and a discharge capacity in the case of repeating a lot of cycles, and therefore further improvement has been required. The present invention aims to provide a lithium ion secondary battery having a long duration of life.

Solution to Problem

One embodiment of the invention relates to an electrolyte solution for a lithium secondary battery containing a sulfonate compound represented by formula (1) and a carboxylic anhydride having one or more C=C double bonds:

(1)

wherein R1 and R2 each independently represent an alkylene group having 1 to 5 carbon atoms.

Advantageous Effects of Invention

According to the invention, a lithium secondary battery which is inexpensive and improved in cycle characteristics can be obtained.

BRIEF DESCRIPTION OF DRAWINGS

FIG. 1 is a schematic block diagram showing the laminated outer package type structure of the secondary battery with non-aqueous electrolyte solution of the invention.

DESCRIPTION OF EMBODIMENTS

The structure of the secondary battery using a non-aqueous electrolyte solution of the invention will be described by referring to the drawing. FIG. 1 is one example of a schematic block diagram of the secondary battery using a non-aqueous electrolyte solution of the invention. The battery according to the invention has a structure, for example, as shown in FIG. 1. The positive electrode comprises layer 1 containing a positive electrode activating material, forming a film on positive electrode current collector 3. The negative electrode comprises layer 2 containing a negative electrode activating material, forming a film on negative electrode current collector 4. These positive and negative electrodes are arranged to face to each other with porous separator 5 in-between. The porous separator 5 is arranged almost in parallel with the layer 2 containing a negative electrode activating material. The secondary battery of the invention consists of an electrode element including these positive and negative electrodes arranged to face to each other, and an electrode solution contained in outer packages 6 and 7. The shape of the non-aqueous electrolyte solution secondary battery according to the embodiment of the invention is not particularly limited and, for example, a laminated outer package type, a cylindrical type, an angular type and a coin type are exemplified.

<Non-Aqueous Electrolyte Solution>

The non-aqueous electrolyte solution in the embodiment of the invention (hereinafter sometimes simply referred to as "the electrolyte solution") contains a sulfonate compound represented by formula (1) and a carboxylic anhydride having one or more C=C double bonds as additives.

In the embodiment of the invention, the non-aqueous electrolyte solution contains, as additives, a sulfonate compound represented by formula (1) (hereinafter sometimes simply referred to as "a sulfonate compound" or "compound A"), and a carboxylic anhydride having a C=C double bond (hereinafter sometimes simply referred to as "carboxylic anhydride" or "compound B").

Both of the sulfonate compound and the carboxylic anhydride contained in the non-aqueous electrolyte solution are decomposed by electrochemical oxidation reduction reaction at the time of charge and discharge reaction and form a film on the surface of the electrode activating material and capable of suppressing decomposition of the electrolyte solution and supporting electrolyte. It is thought that this function is effective for elongation of the duration of life of a lithium ion secondary battery. The present inventors have earnestly and in more detail examined lithium ion secondary batteries equipped with a non-aqueous electrolyte solution containing a sulfonate compound and carboxylic anhydride. As a result, it has been found that the characteristics of lithium ion secondary batteries are remarkably improved by using a non-aqueous electrolyte solution containing a sulfonate compound represented by formula (1) and a carboxylic anhydride having one or more C=C double bonds, and thus the present invention has been achieved.

(Compound A)

In the embodiment of the invention, the non-aqueous electrolyte solution contains a sulfonate compound represented by formula (1) (compound A) as the additive:

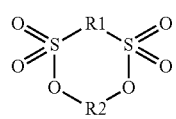

(1)

wherein R1 and R2 each independently represent an alkylene group having 1 to 5 carbon atoms.

In formula (1), the alkylene group includes linear and branched alkylene groups. Preferred alkylene groups include a methylene group and an ethylene group.

By the fact that compound A has a cyclic structure, reactivity on the surface of a negative electrode is improved as compared with sulfonates having a chain structure. Further, by virtue of compound A having two —SO$_2$—O— structures, reactivity on the surface of a negative electrode is improved as compared with monosulfonates having one —SO$_2$—O— structure.

Examples of compound A include methylene methanedisulfonate (MMDS) which is a compound represented by formula (1) in which R1 and R2 each represent a methylene group, and ethylene methanedisulfonate (EMDS). Compound A can be used alone or in combination of two or more.

(Compound B)

In the embodiment of the invention, the non-aqueous electrolyte solution contains a carboxylic anhydride having one or more C=C double bonds in the molecule (compound B). Due to compound B having a C=C double bond in the molecule, affinity to the negative electrode is improved and presumably adsorption becomes easy. Further, since compound B can be polymerized on the negative electrode, even if expansion and contraction of the activating material consequent upon charge and discharge occur, it hardly peels off the surface of the activating material, and presumably a stable film can be formed.

As compound B, a cyclic carboxylic anhydride having one or more C=C double bonds represented by formula (2) is preferably used:

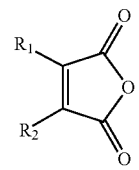

(2)

wherein $R_1$ and $R_2$ each independently represent a hydrogen atom, an alkyl group or an alkenyl group.

In formula (2), the alkyl group or alkenyl group includes linear, branched, or cyclic groups. When $R_1$ and $R_2$ each represent an alkyl group or an alkenyl group, the number of carbon atoms is preferably independently 1 to 6, and more preferably 1 to 3. Alkyl groups having 1 to 3 carbon atoms are more preferred.

Examples of compound B include maleic anhydride, 2-methylmaleic anhydride (citraconic anhydride), and 2,3-dimethylmaleic anhydride. These compounds can be used alone or in combination of two or more.

As described above, in the embodiment of the invention, the sulfonate compound represented by formula (1) (compound A) and carboxylic anhydride having a C=C double bond (compound B) are contained in the electrolyte solution as additives. When compound A and compound B are used in combination, compound B can form a polymer film on the surface of the electrode by having an unsaturated bond in the molecule and can further stabilize the film formed for preventing reduction reaction of the electrolyte solution with compound A.

In the embodiment of the invention, it is more preferred to use methylene methanedisulfonate (MMDS) as compound A and maleic anhydride as compound B. Since maleic anhydride is very inexpensive as compared with MMDS, more inexpensive and better cycle characteristics than the case of using MMDS alone can be obtained when they are used in combination.

The total content of compound A and compound B is not particularly limited, but is preferably 0.01 mol/L or more and 0.2 mol/L or less in the non-aqueous electrolyte solution, more preferably 0.03 mol/L or more and 0.2 mol/L or less, still more preferably 0.06 mol/L or more and 0.16 mol/L or less, still yet more preferably 0.07 mol/L or more and 0.16 mol/L or less, and especially preferably 0.1 mol/L. In addition, the mixing ratio of compound A and compound B (A:B) is not particularly limited, but is preferably 1:9 to 9:1 by molar ratio, more preferably 1:4 to 4:1, still more preferably 1:2.5 to 2.5:1, and especially preferably 1:1.

In the embodiment of the invention, if necessary, the electrolyte solution can contain additives other than compound A and compound B. Examples of other additives include an overcharge preventive, a surfactant and a gelling agent.

The non-aqueous electrolyte solution is not particularly limited and, for example, the above additives can be used by adding into a solution obtained by dissolving a lithium salt in a non-aqueous solvent.

Examples of lithium salts include LiPF$_6$, a lithium imide salt, LiAsF$_6$, LiAlCl$_4$, LiClO$_4$, LiBF$_4$, and LiSbF$_6$. As the lithium imide salt, LiN(C$_k$F$_{2k+1}$SO$_2$) (C$_m$F$_{2m+1}$SO$_2$)

(wherein k and m each independently represent 1 or 2) can be exemplified. These salts can be used alone or in combination of two or more.

The concentration of the lithium salt in the non-aqueous electrolyte solution is preferably 0.7 mol/L or more and 1.5 mol/L or less. When the concentration of the lithium salt is 0.7 mol/L or more, sufficient ion conductivity can be obtained. Further, when the concentration of the lithium salt is 1.5 mol/L or less, the viscosity can be lowered and migration of the ion is not prevented.

As the non-aqueous solvents, at least one solvent selected from the group consisting of cyclic carbonate, chain carbonate, aliphatic carboxylate, γ-lactone, cyclic ether and chain ether can be used, and it is preferred to contain cyclic carbonate and/or chain carbonate. Examples of the cyclic carbonate include propylene carbonate (PC), ethylene carbonate (EC), butylene carbonate (BC), and their derivatives (including fluorine compounds). Examples of the chain carbonate include dimethyl carbonate (DMC), diethyl carbonate (DEC), ethylmethyl carbonate (EMC), dipropyl carbonate (DPC), and their derivatives (including fluorine compounds). Examples of the aliphatic carboxylate include methyl formate, methyl acetate, ethyl propionate, and their derivatives (including fluorine compounds). Examples of the γ-lactone include γ-butyrolactone and derivatives thereof (including fluorine compounds). Examples of the cyclic ether include tetrahydrofuran, 2-methyltetrahydrofuran, and derivatives thereof (including fluorine compounds). Examples of the chain ether include 1,2-diethoxyethane (DEE), ethoxymethoxyethane (EME), ethyl ether, diethyl ether, and their derivatives (including fluorine compounds). As the non-aqueous solvents, besides the above-enumerated solvents, dimethyl sulfoxide, 1,3-dioxolan, formamide, acetamide, dimethylformamide, dioxolan, acetonitrile, propylnitrile, nitromethane, ethylmonoglyme, phosphate triester, trimethoxymethane, dioxolan derivatives, sulfolane, methylsulfolane, 1,3-dimethyl-2-imidazolidinone, 3-methyl-2-oxazolidinone, 1,3-propanesultone, anisole, N-methylpyrrolidone, and their derivatives (including fluorine compounds) can also be used. These solvents can be used alone or in combination of two or more.

<Negative Electrode>

A negative electrode can be prepared by forming a negative electrode activating material layer containing a negative electrode activating material and a negative electrode binding agent on a negative electrode current collector. In the secondary battery with non-aqueous electrolyte solution shown in FIG. 1, as the negative electrode activating material for use in the layer 2 containing a negative electrode activating material, one or two or more materials selected from the group consisting of lithium metal, lithium alloy, and a material capable of occluding and emitting lithium can be used. As the materials capable of occluding and emitting a lithium ion, carbon materials or oxides can be used.

As the carbon materials, lithium intercalating graphite, amorphous carbon, diamond-like carbon, carbon nanotube, and composite oxides thereof can be used. Of the above materials, graphite materials and amorphous carbons are preferred. In particular, graphite materials are preferred because they have high electrical conductivity and are excellent in adhesion to a current collector consisting of a metal such as copper and in voltage stability, impurities contained are little since a negative electrode is formed at a high processing temperature, and they are advantageous for the improvement of the negative electrode performance. As the oxides, any one of silicon oxide, tin oxide, indium oxide, zinc oxide, lithium oxide, phosphorus oxide (phosphoric acid), boric oxide (boric acid), or composites thereof can be used, and it is especially preferred to contain silicon oxide. Regarding the structure, amorphous silicon oxide is preferred. This is for the reasons that silicon oxide is stable and does not react with other compounds, and an amorphous structure does not lead to deterioration ascribable to ununiformity such as grain boundary and defect. Film-forming methods that can be used include a vapor deposition method, a CVD method, and a sputtering method.

A lithium alloy is composed of lithium and a metal capable of forming an alloy. A lithium alloy is composed of a binary or ternary or higher alloy containing lithium and any metal such as Al, Si, Pb, Sn, In, Bi, Ag, Ba, Ca, Hg, Pd, Pt, Te, Zn, or La. In particular, a lithium metal and a lithium alloy are preferably in an amorphous state. This is for the reason that deterioration ascribable to ununiformity such as grain boundary and defect is difficult to occur by an amorphous structure. A lithium metal and a lithium alloy can be formed by a proper method such as a melted liquid cooling method, a liquid quenching method, an atomizing method, a vacuum deposition method, a sputtering method, a plasma CVD method, a light CVD method, a heat CVD method, or a sol-gel method.

Examples of the binding agents for a negative electrode that can be used include polyvinylidene fluoride, a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide, and polyamide imide. The amount used of the binding agent for a negative electrode is preferably 0.5 parts by mass to 25 parts by mass to 100 parts by mass of the negative electrode activating material from the viewpoint of "sufficient binding force" and "heightening of energy" which is in the relationship of tradeoff.

From the electrochemical stability, the material of a negative electrode current collector is preferably aluminum, nickel, copper, silver, or alloys thereof. The shape of a negative electrode current collector is a foil, tabular or mesh.

A negative electrode activating material layer is formed by a doctor blade method, a die coater method, a CVD method or a sputtering method. A negative electrode activating material layer may be formed in advance and then a membrane of aluminum, nickel or the alloy thereof may be formed by a method of vapor deposition or sputtering to form a negative electrode current collector.

<Positive Electrode>

In the secondary battery shown in FIG. 1, as the positive electrode activating material for use in the layer 1 containing a positive electrode activating material, lithium-containing composite oxides such as $LiCoO_2$, $LiNiO_2$, and $LiMn_2O_4$ are exemplified. The transition metal parts of these lithium-containing composite oxides can be replaced with other elements. Lithium-containing composite oxides having a plateau at 4.2 V or more in terms of metallic lithium counter electrode potential can also be used. Examples of the lithium-containing composite oxides include a spinel type lithium manganese composite oxide, an olivine type lithium-containing composite oxide, and an inverse spinel type lithium-containing composite oxide. A compound represented by the following formula (4) can be used as the lithium-containing composite oxide:

$$Li_a(M_xMn_{2-x})O_4 \qquad (4)$$

wherein 0<x<2, 0<a<1.2; and M is at least one selected from the group consisting of Ni, Co, Fe, Cr and Cu.

A positive electrode can be obtained by dispersing these activating materials in a solvent such as N-methyl-2-pyrrolidone (NMP) together with a conductive material, e.g., carbon black, and a binding agent, e.g., polyvinylidene fluoride (PVDF) and kneading, and coating the obtained dispersed and kneaded product on a positive electrode current collector such as an aluminum foil.

<Manufacturing Method of a Secondary Battery>

As a manufacturing method of a secondary battery, a manufacturing method of the secondary battery shown in FIG. 1 will be described as one example. The secondary battery with non-aqueous electrolyte solution as shown in FIG. 1 is manufactured as follows. First, a negative electrode and a positive electrode are laminated in dried air or inert gas atmosphere with porous separator 5 placed in between them, and then, or after the laminates are wound, the negative electrode and the positive electrode are encased in a battery can or an outer package of a flexible film or the like consisting of a laminate of a synthetic resin and a metallic foil, and the outer package is impregnated with a non-aqueous electrolyte solution containing the above compound A and compound B as additives. After sealing the outer package, by charging the non-aqueous electrolyte solution secondary battery, a good film can be formed on the negative electrode. As the porous separator 5, polyolefin, e.g., polypropylene and polyethylene, and a porous film, e.g., fluorine resin are used. The outer package can be optionally selected so long as it is stable against the electrolyte solution and has a sufficient barrier property to water vapor. In the case of a laminated type secondary battery, a laminated film such as polypropylene or polyethylene coated with aluminum or silica can be used as the outer package. In particular, from the viewpoint of restraining volume expansion, it is preferred to use an aluminum laminated film.

EXAMPLES

The embodiment of the invention will be described more specifically with reference to examples, but the invention is not restricted thereto.

Example 1

Preparation of a Battery

Preparation of a battery according to the example will be described. As the positive electrode current collector, an aluminum foil having a thickness of 20 μm, and as the positive electrode activating material, $LiMn_2O_4$ were respectively used. As the negative electrode current collector, a copper foil having a thickness of 10 μm was used, and as the negative electrode activating material, graphite was used on the copper foil. A secondary battery was prepared by laminating the negative electrode and the positive electrode, placing a separator made of polyethylene therebetween.

(Preparation of a Non-Aqueous Electrolyte Solution)

A mixed solvent of EC and DEC (volume ratio: EC/DEC=30/70) was used as the solvent for a non-aqueous electrolyte solution, and $LiPF_6$ was dissolved so as to reach 1M in the non-aqueous electrolyte solution as the supporting electrolyte.

As additives, 1.6% by weight (0.1 mol/L) in a non-aqueous electrolyte solution of cyclic disulfonate (MMDS, hereinafter referred to as "compound A1"), which is a compound represented by formula (1) in which R1 and R2 each represent a methylene group, and 0.5% by weight (0.05 mol/L) in a non-aqueous electrolyte solution of maleic anhydride (hereinafter referred to as "compound B1"), which is a compound represented by formula (2) in which $R_1$ and $R_2$ each represent a hydrogen atom, were added, and thus a non-aqueous electrolyte solution was prepared. A non-aqueous secondary battery was prepared by using the above-prepared non-aqueous electrolyte solution, and charge and discharge cycle test was carried out up to 200 cycles.

In the charge and discharge cycle test, the temperature of the thermostatic chamber was set at 55° C., charge and discharge condition included CCCV charge rate: 1.0 C, CC discharge rate: 1.0 C, charge final voltage: 4.2 V, discharge final voltage: 3.0 V, and charge and discharge were carried out up to 200 cycles. The ratio of the discharge capacity after 200 cycles to the initial discharge capacity was computed as the capacity maintaining rate (%). The results of the discharge capacity after 200 cycles and the capacity maintaining rate are shown in Table 1. The content of additives (% by weight) in Examples and Comparative Examples shows the proportion by weight of each compound to the gross mass of the non-aqueous electrolyte solution. In Table 1, the amount of each compound added to the non-aqueous electrolyte solution was shown in terms of mol/L and % by weight, respectively.

Example 2

A secondary battery was prepared in the same manner as in Example 1 except for adding 0.8% by weight of compound A1 and 0.5% by weight of compound B1 to the non-aqueous electrolyte solution in place of the additives used in the non-aqueous electrolyte solution in Example 1, and charge and discharge cycle test was carried out up to 200 cycles. The results obtained are shown in Table 1.

Example 3

A secondary battery was prepared in the same manner as in Example 1 except for adding 0.4% by weight of compound A1 and 0.5% by weight of compound B1 in place of the additives used in the non-aqueous electrolyte solution in Example 1, and charge and discharge cycle test was carried out up to 200 cycles. The results obtained are shown in Table 1.

Example 4

A secondary battery was prepared in the same manner as in Example 1 except for adding 0.2% by weight of compound A1 and 0.5% by weight of compound B1 in place of the additives used in the non-aqueous electrolyte solution in Example 1, and charge and discharge cycle test was carried out up to 200 cycles. The results obtained are shown in Table 1.

Comparative Example 1

A secondary battery was prepared in the same manner as in Example 1 except for using a mixed solvent of EC and DEC (volume ratio: 30/70) as the solvent of an electrolyte solution, and not using additives and dissolving $LiPF_6$ as the supporting electrolyte, and charge and discharge cycle test was carried out up to 200 cycles. The results obtained are shown in Table 1.

Comparative Example 2

A secondary battery was prepared in the same manner as in Example 1 except for not adding compound A1 and adding 0.1% by weight of compound B1 as the additive for use in the non-aqueous electrolyte solution, and charge and discharge cycle test was carried out up to 200 cycles. The results obtained are shown in Table 1.

Comparative Example 3

A secondary battery was prepared in the same manner as in Example 1 except for not adding compound A1 and adding 0.33% by weight of compound B1 as the additive for use in the non-aqueous electrolyte solution, and charge and discharge cycle test was carried out up to 200 cycles. The results obtained are shown in Table 1.

Comparative Example 4

A secondary battery was prepared in the same manner as in Example 1 except for not adding compound A1 and adding 0.5% by weight of compound B1 as the additive for use in the non-aqueous electrolyte solution, and charge and discharge cycle test was carried out up to 200 cycles. The results obtained are shown in Table 1.

Comparative Example 5

A secondary battery was prepared in the same manner as in Example 1 except for not adding compound A1 and adding 1% by weight of compound B1 as the additive for use in the non-aqueous electrolyte solution, and charge and discharge cycle test was carried out up to 200 cycles. The results obtained are shown in Table 1.

Comparative Example 6

A secondary battery was prepared in the same manner as in Example 1 except for adding 1.6% by weight of compound A1 as the additive for use in the non-aqueous electrolyte solution and not adding compound B1, and charge and discharge cycle test was carried out up to 200 cycles. The results obtained are shown in Table 1.

Comparative Example 7

A secondary battery was prepared in the same manner as in Example 1 except for adding 0.8% by weight of compound A1 as the additive for use in the non-aqueous electrolyte solution and not adding compound B1, and charge and discharge cycle test was carried out up to 200 cycles. The results obtained are shown in Table 1.

Comparative Example 8

A secondary battery was prepared in the same manner as in Example 1 except for adding 0.4% by weight of compound A1 as the additive for use in the non-aqueous electrolyte solution and not adding compound B1, and charge and discharge cycle test was carried out up to 200 cycles. The results obtained are shown in Table 1.

Comparative Example 9

A secondary battery was prepared in the same manner as in Example 1 except for adding 1.6% by weight of compound A1, 1% by weight of succinic anhydride (hereinafter sometimes referred to as "compound C1") as the additives for use in the non-aqueous electrolyte solution, and not adding compound B1, and charge and discharge cycle test was carried out up to 200 cycles. The results obtained are shown in Table 1.

Comparative Example 10

A secondary battery was prepared in the same manner as in Example 1 except for adding 0.8% by weight of compound A1, 0.8% by weight of compound C1 as the additives for use in the non-aqueous electrolyte solution, and not adding compound B1, and charge and discharge cycle test was carried out up to 200 cycles. The results obtained are shown in Table 1.

TABLE 1

| Results of Discharge Capacity and Capacity Maintaining Rate after 200 Cycles | Compound A1 | | Compound B1 | | Compound C1 | | Capacity Maintaining Rate (%) @ 200 Cycles | Discharge Capacity (mAh) @ 200 Cycles |
|---|---|---|---|---|---|---|---|---|
| | mol/L | wt % | mol/L | wt % | mol/L | wt % | | |
| Example 1 | 0.1 | 1.6 | 0.05 | 0.5 | 0 | 0 | 80.1 | 47.3 |
| Example 2 | 0.05 | 0.8 | 0.05 | 0.5 | 0 | 0 | 81.9 | 48.7 |
| Example 3 | 0.025 | 0.4 | 0.05 | 0.5 | 0 | 0 | 77.1 | 46.9 |
| Example 4 | 0.0125 | 0.2 | 0.05 | 0.5 | 0 | 0 | 73.6 | 44.8 |
| Comparative Example 1 | 0 | 0 | 0 | 0 | 0 | 0 | 71.0 | 42.9 |
| Comparative Example 2 | 0 | 0 | 0.01 | 0.1 | 0 | 0 | 69.6 | 41.6 |
| Comparative Example 3 | 0 | 0 | 0.033 | 0.33 | 0 | 0 | 71.4 | 42.2 |
| Comparative Example 4 | 0 | 0 | 0.05 | 0.5 | 0 | 0 | 72.6 | 43.8 |
| Comparative Example 5 | 0 | 0 | 0.1 | 1.0 | 0 | 0 | 77.8 | 46.4 |
| Comparative Example 6 | 0.1 | 1.6 | 0 | 0 | 0 | 0 | 80.9 | 47.6 |
| Comparative Example 7 | 0.05 | 0.8 | 0 | 0 | 0 | 0 | 76.8 | 45.2 |

TABLE 1-continued

| Results of Discharge Capacity and Capacity Maintaining Rate after 200 Cycles | Compound A1 | | Compound B1 | | Compound C1 | | Capacity Maintaining Rate (%) @ 200 Cycles | Discharge Capacity (mAh) @ 200 Cycles |
|---|---|---|---|---|---|---|---|---|
| | mol/L | wt % | mol/L | wt % | mol/L | wt % | | |
| Comparative Example 8 | 0.025 | 0.4 | 0 | 0 | 0 | 0 | 69.3 | 42.8 |
| Comparative Example 9 | 0.1 | 1.6 | 0 | 0 | 0.1 | 1 | 70.8 | 44.2 |
| Comparative Example 10 | 0.05 | 0.8 | 0 | 0 | 0.05 | 0.8 | 65.5 | 41.2 |

[In Table 1, the amount of each of compounds A1, B1 and C1 added to the electrolyte solution is shown in terms of mol/L and % by weight. In each Example and Comparative Example, graphite was used as the negative electrode activating material, the solvent was EC/DEC = 3/7 (volume ratio), and LiPF$_6$ (concentration in the electrolyte solution of 1M) was used as the supporting electrolyte.]

(Results of Evaluation of Cycle Test)

As described above, 1 mol/L of LiPF$_6$ as the supporting electrolyte was added to the mixed solvent containing EC and DEC (volume ratio: 30/70) as the solvent for the non-aqueous electrolyte solution, and compound A1 and compound B1 were added thereto as the additives in the mixing ratio as shown in Table 1, and thus the lithium secondary battery equipped with the non-aqueous electrolyte solution was prepared, and the cycle test was carried out by using this secondary battery (Examples 1 to 4). For comparison, the cycle test was carried out at the same time as to the case where compound A1 alone was mixed into the non-aqueous electrolyte solution (Comparative Examples 6 to 8), the case where compound B1 alone was mixed (Comparative Examples 2 to 5), the case where compound A1 and compound C1 were added in the mixing ratio as shown in Table 1 (Comparative Examples 9 and 10), and the case where no additive was added (Comparative Example 1).

From the results of Examples 1 to 4, it was seen that the cases where both compound A1 and compound B1 were added to the non-aqueous electrolyte solution showed good capacity maintaining rate and discharge capacity. In particular, in Examples 1 and 2, both capacity maintaining rate and discharge capacity were remarkably improved. Since the concentration of compound A1 was high in Comparative Example 6, relatively good capacity maintaining rate and discharge capacity were exhibited but there is a problem that the manufacturing cost is high.

When Comparative Examples 3 to 7 are compared with Comparative Example 1, it can be seen that Comparative Examples 3 to 7 in which either compound A1 or compound B1 was added alone showed improvement in the cycle life both in the discharge capacity and the capacity maintaining rate as compared with Comparative Example 1 in which neither compound A1 nor compound B1 was added. On the other hand, in Comparative Examples 2 and 8, both the discharge capacity and the capacity maintaining rate were low as compared with Comparative Example 1. This is presumably for the reason that a good film was not formed on the graphite of the negative electrode when the amount of the additive added is too little, therefore, which affected the film formed in the case where the additive was not used.

Further, in Comparative Examples 9 and 10, in the cases where compound A1 and compound C1 were added, the cycle characteristics were lower than the characteristics in the case of using compound A1 alone, and from this fact it was clearly seen that improving effect of the cycle characteristics could not be obtained by the combination of compound A1 and compound C1. Compound C1 is succinic anhydride, which is a carboxylic anhydride not having a C=C double bond. From this fact it was found that when the carboxylic anhydride to be used as the additive in combination with compound A1 has a C=C double bond, remarkable advantages of the invention can be obtained.

EXPLANATION OF SYMBOLS

1 Positive electrode activating material layer
2 Negative electrode activating material layer
3 Positive electrode current collector
4 Negative electrode current collector
5 Porous separator
6 Laminated outer package
7 Laminated outer package
8 Negative electrode tab
9 Positive electrode tab

The invention claimed is:

1. An electrolyte solution for a lithium secondary battery, comprising:
a sulfonate compound represented by formula (1), and
a carboxylic anhydride having one or more C=C double bonds;

(1)

wherein R1 and R2 each independently represent an alkylene group having 1 to 5 carbon atoms,
wherein the carboxylic anhydride having one or more C=C double bonds is maleic anhydride,
wherein the sulfonate compound represented by formula (1) is methylene methanedisulfonate,
wherein the total content of the sulfonate compound represented by formula (1) and the carboxylic anhydride having one or more C=C double bonds is 0.06 mol/L to 0.16 mol/L, and
wherein the molar ratio of the sulfonate compound and the carboxylic anhydride having one or more C=C double bonds is 1:4 to 4:1.

2. The electrolyte solution for a lithium secondary battery according to claim 1, further comprising 1M LiPF$_6$ as supporting electrolyte.

3. The electrolyte solution for a lithium secondary battery according to claim 1, wherein the total content of the sulfonate compound represented by formula (1) and the carboxylic anhydride having one or more C=C double bonds is 0.07 mol/L to 0.16 mol/L.

4. The electrolyte solution for a lithium secondary battery according to claim 1, wherein the molar ratio of the sulfonate compound and the carboxylic anhydride having one or more C=C double bonds is 1:2.5 to 2.5:1.

5. A lithium secondary battery comprising the electrolyte solution for a lithium secondary battery according to claim 1.

6. A method for manufacturing a lithium secondary battery having an electrode element, an electrolyte solution, and an outer package, comprising:
preparing an electrode element by arranging a positive electrode and a negative electrode to face to each other, and
sealing the electrode element and a non-aqueous electrolyte solution containing a sulfonate compound represented by formula (1) and a carboxylic anhydride having one or more C=C double bonds in the outer package,

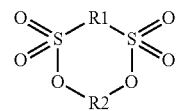

(1)

wherein R1 and R2 each independently represent an alkylene group having 1 to 5 carbon atoms,
wherein the carboxylic anhydride having one or more C=C double bonds is maleic anhydride,
wherein the sulfonate compound represented by formula (1) is methylene methanedisulfonate,
wherein the total content of the sulfonate compound represented by formula (1) and the carboxylic anhydride having one or more C=C double bonds is 0.06 mol/L to 0.16 mol/L, and
wherein the molar ratio of the sulfonate compound and the carboxylic anhydride having one or more C=C double bonds is 1:4 to 4:1.

* * * * *